United States Patent [19]

Bigelow

[11] 4,452,133

[45] Jun. 5, 1984

[54] CAM GUIDE OPERATING MECHANISM FOR ROLL BALING MACHINE

[75] Inventor: Donald O. Bigelow, New Holland, Pa.

[73] Assignee: Sperry Corporation, New Holland, Pa.

[21] Appl. No.: 472,512

[22] Filed: Mar. 7, 1983

[51] Int. Cl.³ .............................................. B30B 5/06
[52] U.S. Cl. ....................................... 100/88; 56/341
[58] Field of Search .................... 100/88; 56/341, 342, 56/343

[56] References Cited

U.S. PATENT DOCUMENTS

| | | | |
|---|---|---|---|
| Re. 29,140 | 2/1977 | Mast et al. | 56/341 |
| 3,815,345 | 6/1974 | Mast et al. | 56/341 |
| 3,859,909 | 1/1975 | Mast | 100/88 |
| 4,208,862 | 6/1980 | Waldrop et al. | 100/88 X |
| 4,343,141 | 8/1982 | Oellig et al. | 100/88 X |

*Primary Examiner*—Billy J. Wilhite
*Assistant Examiner*—Christine A. Peterson
*Attorney, Agent, or Firm*—Darrell F. Marquette; Frank A. Seemar; Larry W. Miller

[57] ABSTRACT

In a roll baling machine having a bale forming apron defining an expandable bale chamber, guide members extending into the bale chamber to support the apron and thereby define an initial shape for the bale chamber, the guide members being movable out of the bale chamber during bale formation without being opposed by springs which are employed to urge the guide members back into the bale chamber after bale discharge.

12 Claims, 3 Drawing Figures

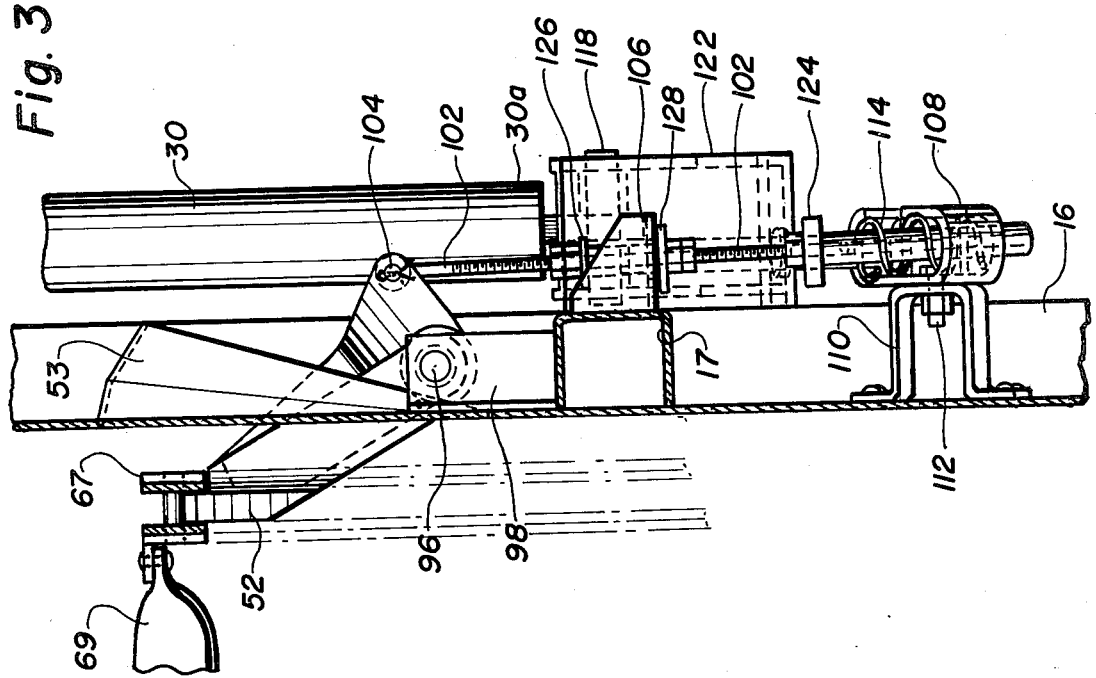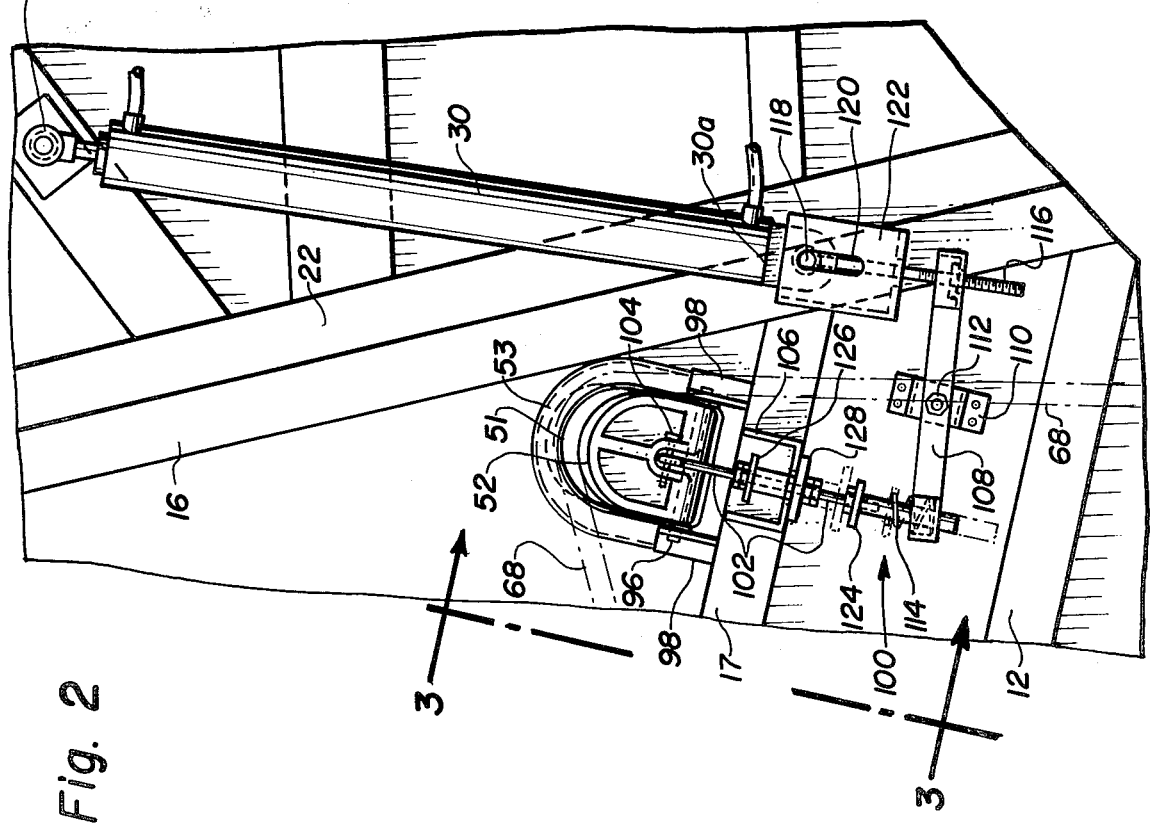

CAM GUIDE OPERATING MECHANISM FOR ROLL BALING MACHINE

BACKGROUND AND SUMMARY OF THE INVENTION

Roll baling machines such as disclosed in U.S. Pat. No. 3,815,345 have used guide members to support a bale forming apron in order to define an initial shape for an expandable bale chamber. These guide members are movable between an extended position inside the bale chamber where they support the apron and a retracted position outside the bale chamber. The guide members are constantly urged toward their extended positions by springs. This constant urging of the guide members results in bale damage such as scuffing and hollowing out of bale ends during formation.

The present invention overcomes this problem by providing that the guide members are movable from their extended positions to their retracted positions during bale formation without being opposed by the springs which remain relaxed. In other words, the springs do not constantly urge the guide members toward their extended positions, but they do apply force to return the guide members to their extended positions during discharge of a bale from the machine. The guide members are maintained in their extended positions by the bale forming apron which rests thereon to define the initial shape for the expandable bale chamber.

BRIEF DESCRIPTION OF THE DRAWINGS

FIG. 2 is an enlarged view of a portion of the machine shown in FIG. 1; and

FIG. 3 is a sectional view taken along lines 3—3 in FIG. 2.

DETAILED DESCRIPTION OF THE PREFERRED EMBODIMENT

Figure 1:
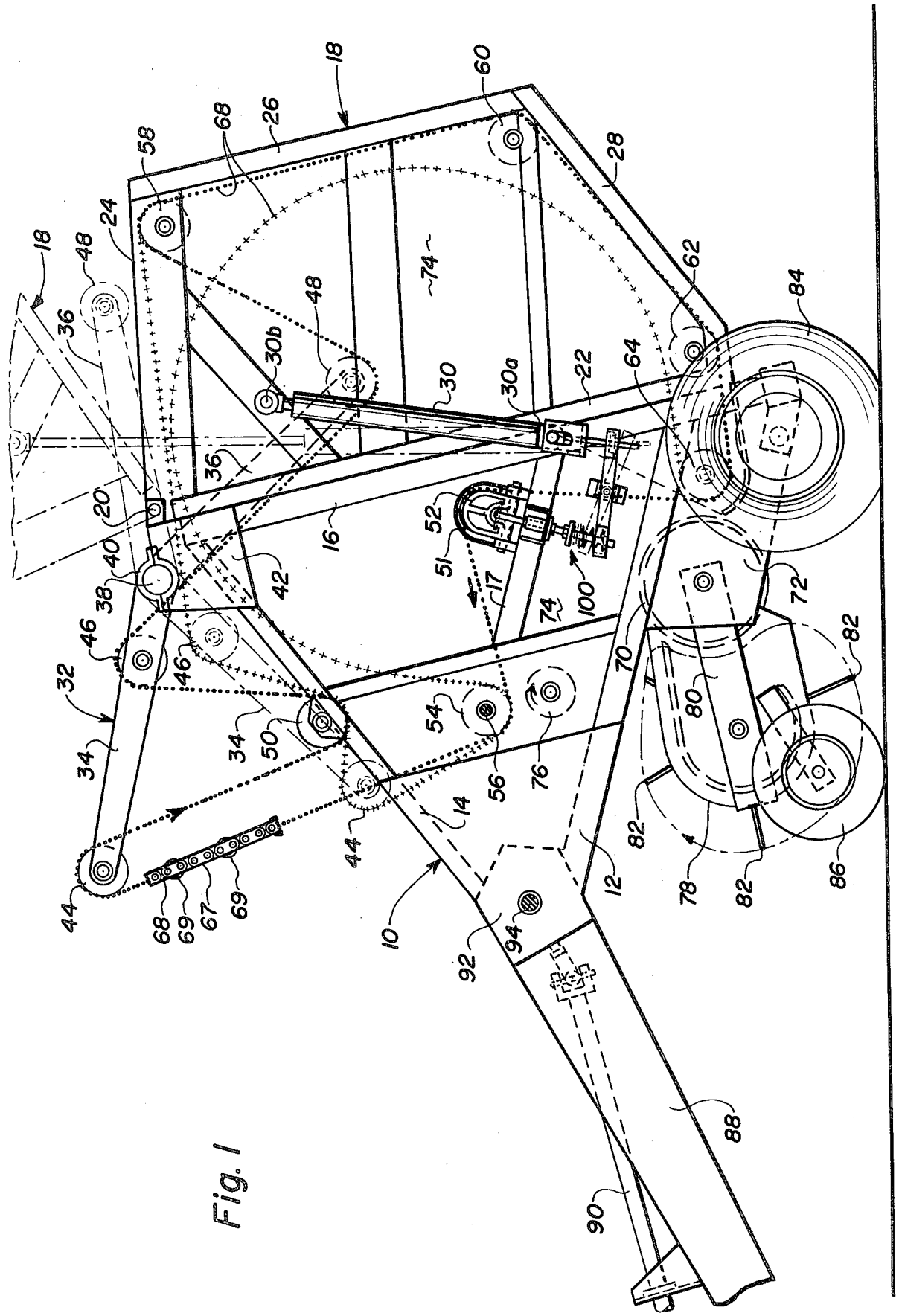
FIG. 1 is a side elevation of a roll baling machine embodying the present invention.

Referring to FIG. 1, a typical roll baling machine embodying the present invention includes a base frame 10 having opposite sides each formed generally of frame members 12,14,16 rigidly connected in a triangular configuration with side plates substantially covering the space therebetween. A rear frame 18 is pivotally connected at 20 to the base frame 10 by suitable bearings. The rear frame 18 has opposite sides each formed generally of frame members 22,24,26,28 rigidly connected in a substantially trapezoidal configuration with side plates substantially covering the space therebetween. Other frame members (not shown) extend transversely of the machine and connect the opposite sides of the base frame 10 and the opposite sides of the rear frame 18.

A pair of hydraulic cylinders 30 are mounted at the sides of the machine and are connected at their lower ends 30a to base frame 10 and at their upper ends 30b to the rear frame 18. The hydraulic cylinders would be operated in known manner to move the rear frame 18 upwardly from its lower position shown in full lines in FIG. 1 to an upper position shown in phantom.

An arm assembly 32 is rotatably mounted on the base frame 10 and includes front arms 34 and rear arms 36 disposed inboard the sides of the machine. The front and rear arms 34,36 are rigidly connected to a cross beam that extends transversely of the machine. The arm assembly 32 also includes support shafts 38 which are rotatably mounted in bearing members 40 carried by brackets 42 on the opposite sides of the base frame 10. The arm assembly 32 is normally urged toward the position shown partly in full lines in FIG. 1 conventional means such as extension springs (not shown) connected between the arm assembly 32 and the base frame 10.

The arm assembly 32 carries rotatable guide members 44,46 on the front arms 34 and rotatable guide members 48 on the rear arms 36. The base frame 10 supports rotatable guide members 50 on the frame members 14 and cam guide members 52 inboard its opposite sides on the frame members 17. The cam guide members 52 extend through openings 51 formed in the opposite sides of the base frame 10. Sprockets 54 are provided inboard the opposite sides of the base frame 10 and are fixed on a transverse shaft 56 that is rotatably mounted in suitable bearings on the base frame 10. The rear frame 18 supports rotatable guide members 58,60,62,64 inboard its opposite sides.

A flexible bale forming apron 68 is movably supported on the aforementioned guide members and sprockets following the path shown in FIG. 1. The apron 68 is preferably formed of a pair of endless link-type chains 67 connected at spaced intervals by transverse bars or slats 69. The apron chains 67 extend around and engage the various guide members and the sprockets 54. This apron 68 is of the known type disclosed in U.S. Pat. No. 3,901,007 and designated therein by the numeral "82".

A floor roller 70 extends transversely of the machine and is rotatably supported by brackets 72 on the opposite sides of the base frame 10. Preferably, the floor roller 70 consists of a hollow metal drum with a coating or layer of rubber on its outer surface. When the machine is empty, the upper surface of the floor roller 70 cooperates with a course of the apron 68 that extends upwardly and rearwardly from the guide members 64 over the cam guide members 52 and then downwardly and forwardly to the sprockets 54 to define a bale chamber 74 having an initial wedge shape in side elevation. In this initial wedge shape, the forward end of the bale chamber 74 is narrower than the rearward end thereof. A stripper roller 76, preferably rubber coated, extends transversely of the machine and is rotatably supported on the opposite sides of the base frame 10. The stripper roller 76 is positioned at the forward end of the bale chamber 74 in close proximity to the apron 68.

A pickup header 78 extends transversely of the machine and is supported by brackets 80 on the opposite sides of the base frame 10. The pickup header 78 is preferably of conventional type having a series of projecting fingers 82 rotating in the path indicated for engaging and picking up windrowed crop material. A pair of wheels 84 mounted on the opposite sides of the base frame 10 support the machine. Another pair of wheels 86 support the pickup header 78. A tongue 88 is provided on the forward end of the base frame 10 for connection to a tractor.

An input shaft 90 is supported on the tongue 88 and is connectable at one end to the power take off unit (PTO) of a tractor (not shown). The other end of the input shaft 90 is connected through a gear box 92 to a transverse output shaft 94. Conventional means such as sheaves and a belt (not shown) may be used to deliver power from the output shaft 94 to the shaft 56 in order to drive the sprockets 54 and thereby propel the apron 68 in the direction indicated. Other conventional means such as sprockets and chains (not shown) may be used to deliver power from the shaft 56 to drive the floor roller 70, the stripper roller 76, and the pickup header 78 in the directions indicated.

As the machine is pulled across a field by a tractor, the pickup header fingers 82 engage, pick up and deliver windrowed crop material onto the upper surface of the rotating floor roller 70 in the bale chamber 74. The crop material is carried upwardly and then coiled back downwardly onto itself by the apron 68 which moves upwardly and rearwardly from the guide members 64 over the cam guide members 52 and then downwardly and forwardly to the sprockets 54. This movement of the apron 68 in the bale chamber 74 effectively starts the core of the roll bale. The rotating stripper roller 76 removes crop material from the apron 68 at the forward end of the bale chamber 74 and delivers it back downwardly into the bale chamber 74. The roll bale increases in diameter lifting the inner course of the apron 68 that extends between the guide members 64 and the sprockets 54 off the cam guide members 52, and expanding the bale chamber 74 from its initial wedge shape to a substantially circular shape. The expansion of the bale chamber 74 results in movement of the inner course of the apron 68 into the rear frame 18. This movement of the apron 68 is accomplished by rotation of the arm assembly 30 in a counterclockwise direction as seen in FIG. 1. When it is desired to discharge the completed bale from the machine, the rear frame 18 is raised upwardly as shown in phantom. This stretches the inner course of the apron 68 across the space between the guide members 64 and the sprockets 54 thereby assisting the bale to exit the machine.

Referring now particularly to FIGS. 2 and 3, it will be seen that the cam guide members 52 are pivotally mounted on shafts 96 supported in brackets 98. Shield members 53 are provided around the openings 51 through which the cam guide members 52 extend. Mechanisms 100 are provided for operating the cam guide members 52. Each mechanism 100 includes a rod 102 connected at its upper end to a cam guide member 52 by a pin 104. The rods 102 are slidable through openings in brackets 106 and have their lower ends slidably received in levers 108. Each lever 108 is pivotally mounted on a bracket 110 by a bolt 112. The levers 108 each support a coil spring 114 which is disposed concentrically on an associated rod 102. A push rod 116 is secured to the lower end 30a of each hydraulic cylinder 30. The push rods 116 are fastened to the levers 108. The lower ends 30a of the hydraulic cylinders 30 carry pins 118 which are connected to the push rods 116. The pins 118 are slidably disposed in slots 120 formed in brackets 122. The brackets 98,106,110 and 122 are all fixed to the base frame 10.

When the machine of FIG. 1 is empty and is ready to form a bale, the apron chains 67 will be resting on the upper surfaces of the cam guide members 52 thereby maintaining the cam guide members 52 in an extended position shown best in FIG. 3. In this extended position, there is no force exerted on the cam guide members 52 by the springs 114 since the springs 114 are completely relaxed. During formation of a bale in the bale chamber 74, the apron chains 67 are lifted off the cam guide members 52. The bale then pushes against the cam guide members 52 causing them to pivot (in a clockwise direction as seen in FIG. 3) on the shafts 96 to a retracted position outside the bale chamber 74. This pivoting movement of the cam guide members 52 is not opposed by the springs 114 because the rods 102 are not moved downward far enough to compress the springs 114 between the levers 108 and washers 124 secured on the rods 102. The springs 114 remain relaxed as the cam guide members 52 are moved from their extended positions to their retracted positions. Other washers 126 on the rods 102 engage the brackets 106 to limit the downward movement of the rods 102 and thereby limit the pivoting movement of the cam guide members 52. Thus, the cam guide members 52 are moved out of the bale chamber 74 without being opposed by the springs 114 thereby preventing the cam guide members 52 from damaging the ends of the bale during formation.

When a bale has been formed in the machine and it is desired to discharge the bale, the hydraulic cylinders 30 are actuated to raise the rear frame 18. The initial actuation of the hydraulic cylinders 30 causes the pins 118 to be moved downward in the slots 120 in the brackets 122. This downward movement of the pins 118 causes the levers 108 to be rotated via the push rods 116 about the bolts 112 (in a clockwise direction as seen in FIG. 2) so that the springs 114 are engaged and compressed between the levers 108 and the washers 124. The springs 114 then exert force through the rods 102 to the cam guide members 52 to move them back into the extended position shown in FIG. 3 under the apron chains 67 as soon as the bale exits the machine. Further washers 128 on the rods 102 engage the brackets 106 to limit the upward movement of the rods 102 and thereby limit the movement of the cam guide members 52 into the bale chamber 74. After the bale has been discharged, the hydraulic cylinders 30 are actuated to lower the rear frame 18. As the rear frame 18 is lowered, the apron chains 67 are lowered down onto the upper surfaces of the cam guide members 52. The mechanisms 100 are each returned to the position shown in FIG. 2 so that no force will be exerted on the cam guide members 52 by the springs 114 until the hydraulic cylinders 30 are actuated again to raise the rear frame 18.

It will be understood that the washers 126 and 128 are adjustable on the rods 102 to vary the relative locations for the extended and retracted positions of the guide members 52. The washers 124 are also adjustable on the rods 102 to vary the amount of compression of the springs 114 and thus the amount of force exerted by the springs 114 on the guide members 52.

The following claims are intended to cover all modifications and variations of the preferred embodiment of the present invention without departing from the spirit and scope of the invention.

Having thus described the invention, what is claimed is:

1. In a roll baling machine including a base frame, a bale forming apron supported on said base frame defining an expandable bale chamber, guide means on said base frame movable between an extended position inside said bale chamber for supporting said bale forming apron in order to define an initial shape for said bale chamber and a retracted position outside said bale chamber, spring means for urging said guide means toward said extended position, the improvement comprising:

said guide means being movable from said expanded position to said retracted position during bale formation without being opposed by said spring means.

2. The improvement of claim 1, wherein said spring means is relaxed when said guide means is in said extended position.

3. The improvement of claim 2, wherein said spring means remains relaxed as said guide means moves from said extended position to said retracted position during bale formation.

4. The improvement of claim 3, wherein said bale forming apron contacts said guide means to maintain said guide means in said extended position.

5. The improvement of claim 4, wherein said guide means is moved from said extended position to said retracted position by a bale that is being formed in said bale chamber.

6. A roll baking machine comprising:
(a) a base frame;
(b) a bale forming apron supported on said base frame defining an expandable bale chamber;
(c) guide means on said base frame movable between an extended position inside said bale chamber for supporting said bale forming apron in order to define an initial shape for said bale chamber and a retracted position outside said bale chamber;
(d) spring means for urging said guide means toward said extended position; and
(e) said guide means being moved from said extended position to said retracted position during bale formation without being opposed by said spring means.

7. The roll baling machine of claim 6, further comprising:
(a) a rear frame pivotally connected to said base frame for movement between a lower position whereby a bale may be formed in said bale chamber and an upper position whereby a bale may be discharged from said bale chamber; and
(b) said guide means being urged by said spring means toward said extended position in response to said rear frame being moved from said lower position toward said upper position.

8. The roll baling machine of claim 7, further comprising:
(a) actuating means for moving said guide means from said retracted position to said extended position;
(b) said actuating means including hydraulic cylinder means connected between said base frame and said rear frame for moving said rear frame between said lower and upper positions;
(c) said actuating means also including a lever pivotally mounted on said base frame, said lever being connected at one end to said hydraulic cylinder means and at the other end to said guide means; and
(d) said lever acting on said spring means to cause said spring means to exert force on said guide means to move said guide means from said retracted position to said extended position in response to said hydraulic cylinder means moving said rear frame from said lower position toward said upper position.

9. The roll baling machine of claim 8, wherein said spring means is compressed by said lever in order to exert force on said guide means.

10. The roll baling machine of claim 9, wherein said spring means comprises a coil spring, and further comprising a rod connected between said guide means and said lever with said coil spring being disposed on said rod.

11. The roll baling machine of claim 10, wherein one end of said hydraulic cylinder means is connected to said base frame for limited slidable movement relative to said base frame upon initial activation of said hydraulic cylinder means to move said rear frame from said lower position toward said upper position, and said limited slidable movement of said hydraulic cylinder means one end causing said lever to pivot to thereby cause said coil spring to be compressed on said rod.

12. The roll baling machine of claim 11, wherein said hydraulic cylinder means one end carries a pin which is slidably disposed in a slot on said base frame.

* * * * *